United States Patent
Ito

Patent Number: 5,587,841
Date of Patent: Dec. 24, 1996

[54] ZOOM LENS SYSTEM

[75] Inventor: Takayuki Ito, Tokyo, Japan

[73] Assignee: Asahi Kogaku Kogyo Kabushiki Kaisha, Tokyo, Japan

[21] Appl. No.: 281,093

[22] Filed: Jul. 27, 1994

[30] Foreign Application Priority Data

Jul. 27, 1993 [JP] Japan .................... 5-184622

[51] Int. Cl.$^6$ .................... G02B 15/14
[52] U.S. Cl. .................... 359/689; 359/708
[58] Field of Search .................... 359/676, 680, 359/681, 682, 689, 708

[56] References Cited

U.S. PATENT DOCUMENTS

| | | | |
|---|---|---|---|
| 4,952,038 | 8/1990 | Ito | 359/689 |
| 4,978,204 | 12/1990 | Ito | 359/689 |
| 5,033,832 | 7/1991 | Ito | 359/689 |
| 5,069,536 | 12/1991 | Ogata | 359/689 |
| 5,111,338 | 5/1992 | Nakayama | 359/686 |
| 5,144,489 | 9/1992 | Shimbayama | 359/689 |
| 5,162,947 | 11/1992 | Ito | 359/692 |
| 5,175,648 | 12/1992 | Mori | 359/689 |
| 5,218,476 | 6/1993 | Ito | 359/676 |
| 5,315,439 | 5/1994 | Ito | 359/689 |
| 5,343,329 | 8/1994 | Ito | 359/689 |

FOREIGN PATENT DOCUMENTS

| | | |
|---|---|---|
| 2287507 | 11/1990 | Japan . |
| 3212607 | 9/1991 | Japan . |
| 3240015 | 10/1991 | Japan . |

Primary Examiner—Georgia Y. Epps
Assistant Examiner—Dawn-Marie Bey
Attorney, Agent, or Firm—Greenblum & Bernstein P.L.C.

[57] ABSTRACT

A zoom lens system including three lens groups. A positive first lens group having a negative lens and a positive lens, a positive second lens group having a negative lens assembly and a positive lens assembly, and a negative third lens group. The first, second and third lens groups are moved toward the object to be photographed upon the zooming operation from a short focal length to a long focal length and satisfy the relationship of:

$$0 < f_w/f_1 < 0.5 \quad (1)$$

$$1.7 < N_{1P} \quad (2)$$

$$1.75 < N_{2aN} \quad (3)$$

$$1.7 < N_{2bP}, \quad (4)$$

wherein $f_w$ designates the focal length of the whole lens system at the wide angle extremity, $f_1$ the focal length of the first lens group, $N_{1P}$ the refractive index of the positive lens of the first lens group, $N_{2aN}$ the refractive index of the negative lens of the first negative lens assembly of the second lens group, and $N_{2bP}$ the refractive index of the positive lens of the second positive lens assembly of the second lens group.

15 Claims, 6 Drawing Sheets

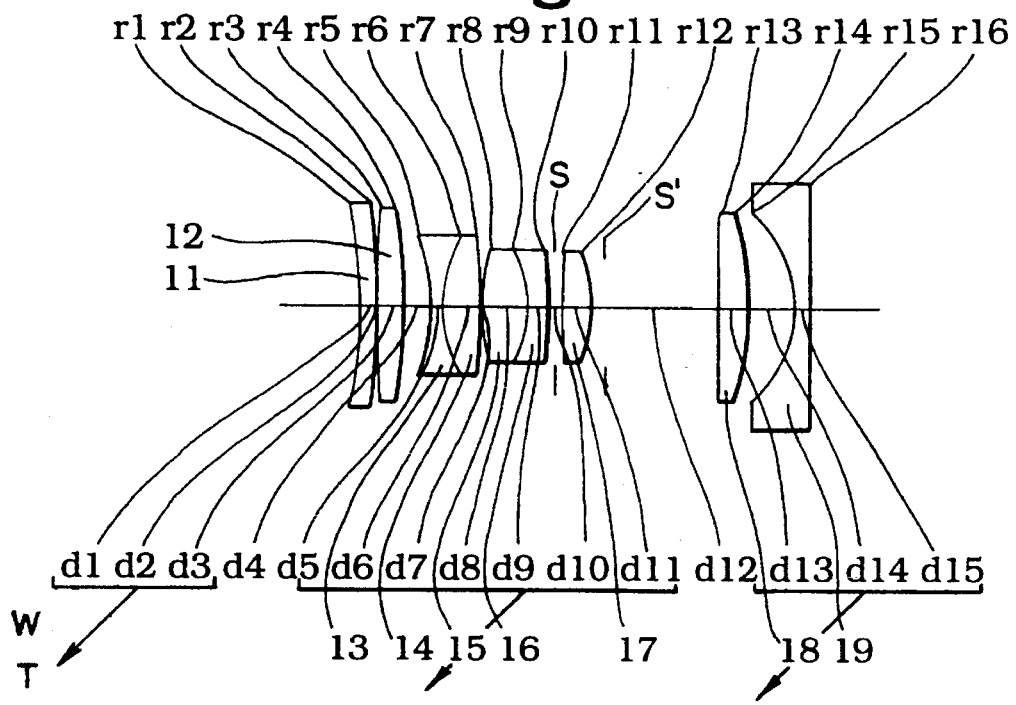
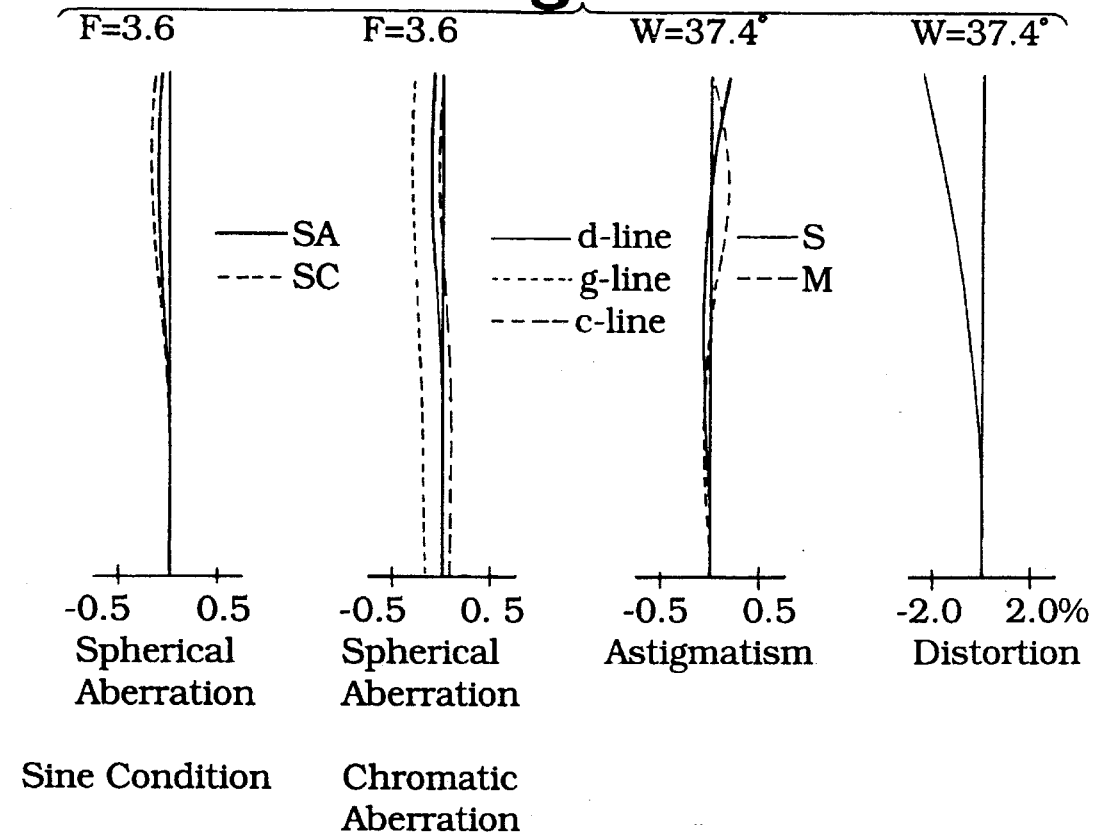

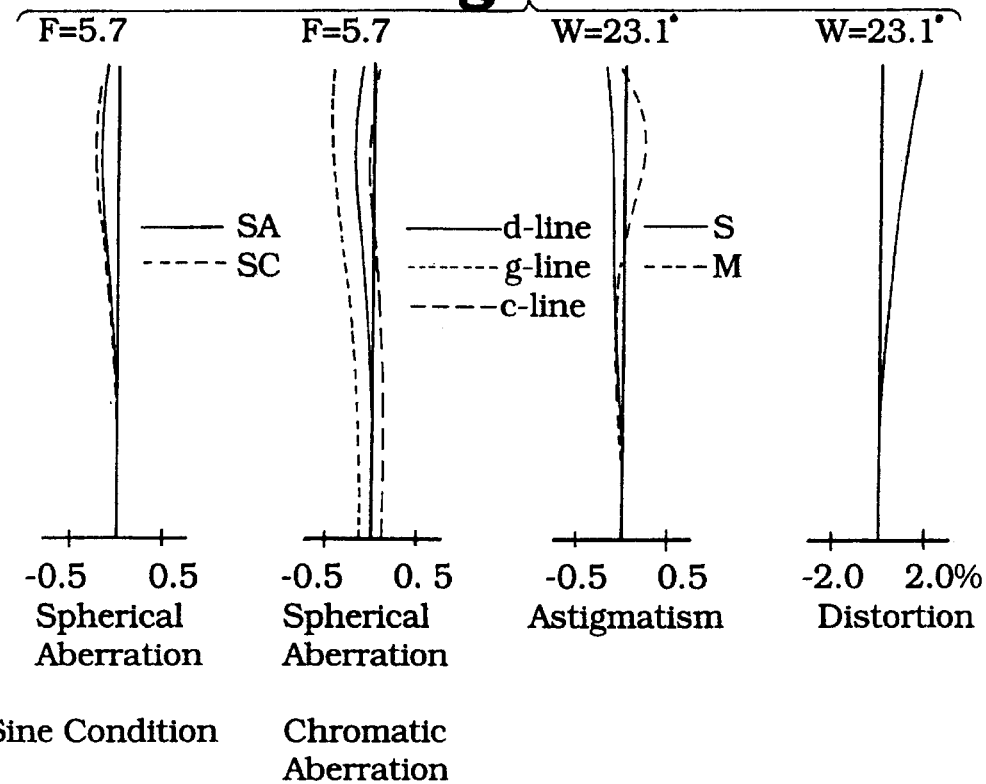
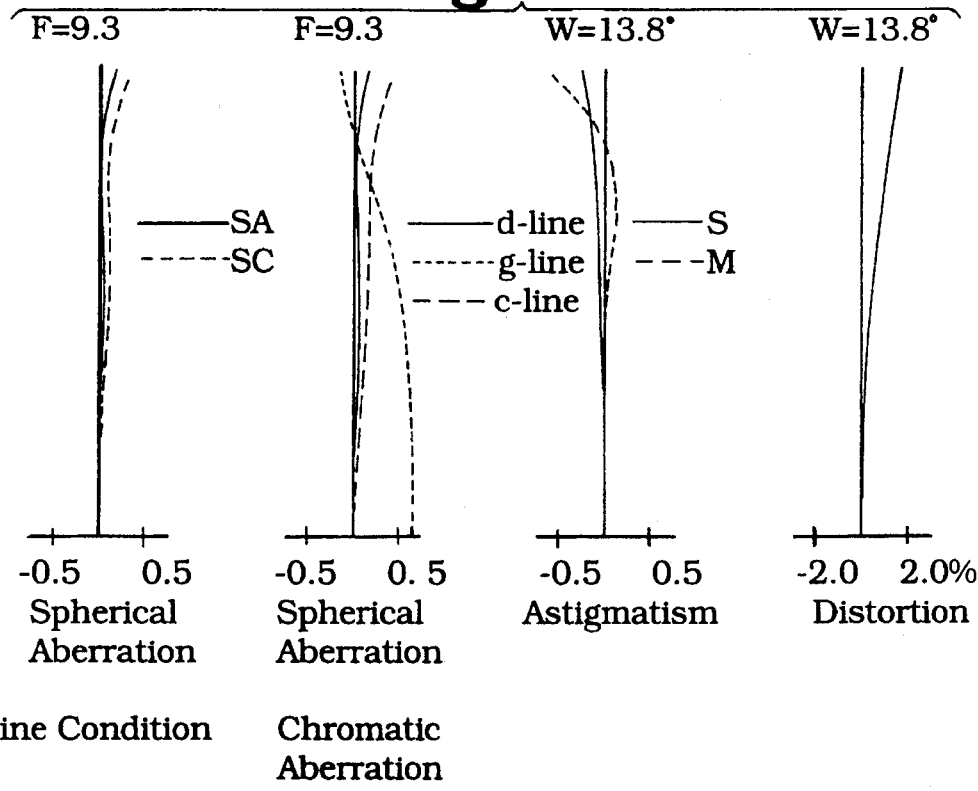

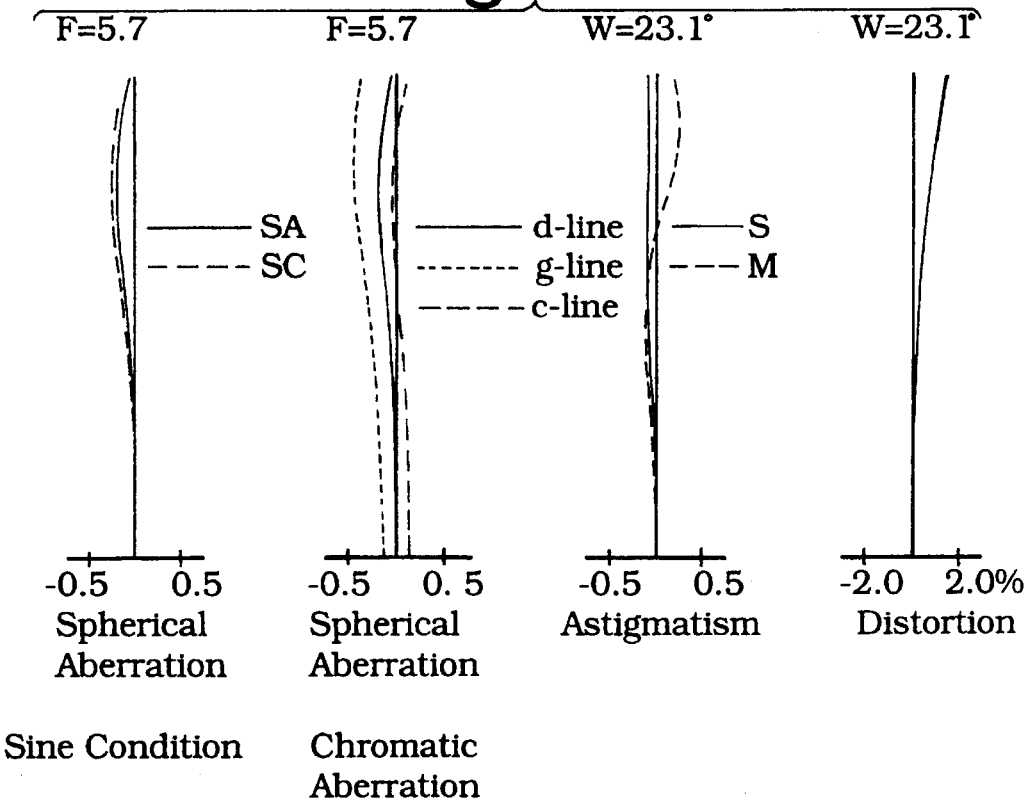
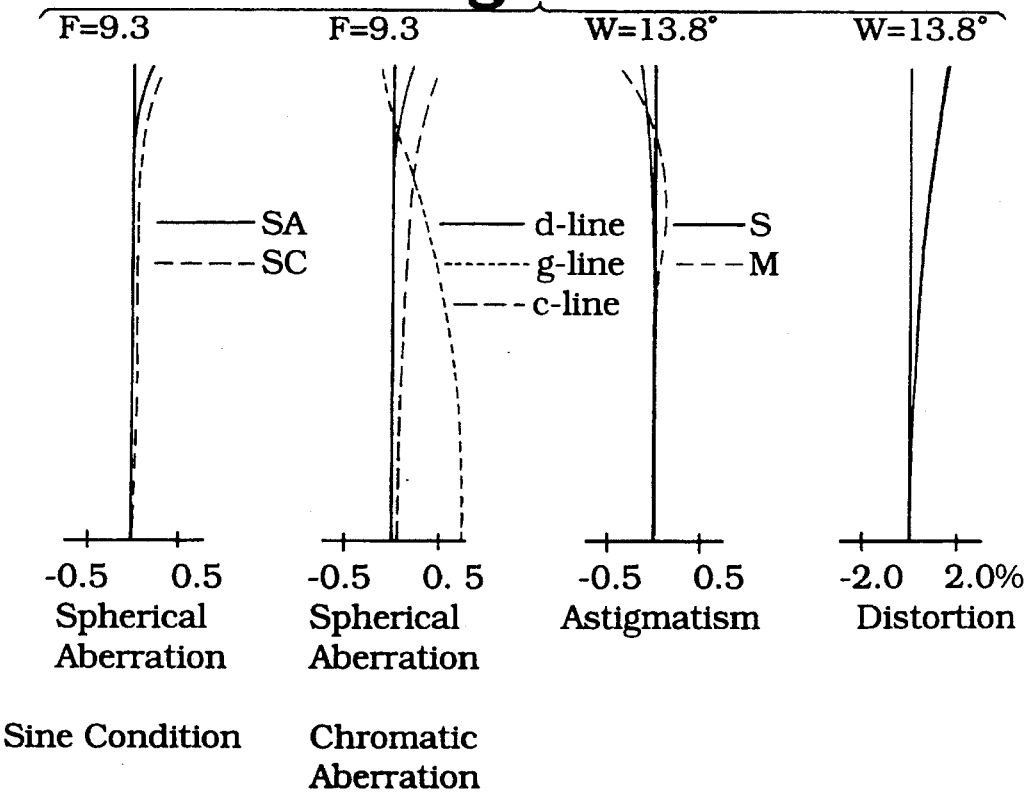

ZOOM LENS SYSTEM

BACKGROUND OF THE INVENTION

1. Field of the Invention

The present invention relates to a zoom lens for a compact camera in which the back focal length of the lens arrangement is limited to a small size, and more precisely, it relates to a zoom lens system for a compact camera, having a wide angle of view, i.e., a half angle of view of approximately 37°, and a high variable power of approximately 3.

2. Description of Related Art

In a known zoom lens for a compact camera whose half angle of view is approximately 37° which is a relatively wide angle for a compact camera zoom lens and that has a large magnification, there are two types of optical arrangements. The first type of optical arrangement is comprised of, for example, three groups of lenses consisting of a first negative lens group, a second positive lens group and a third negative lens group (e.g., Japanese Unexamined Patent Publication No.3-212607), or four groups of lenses consisting of a first negative lens group, a second positive lens group, a third positive lens group and a fourth negative lens group (e.g., Japanese Unexamined Patent Publication No. 3-240015). In the first type of optical arrangement, the first lens group has a negative power. The second type of optical arrangement is comprised of, for example, three groups of lenses consisting of a first positive lens group, a second positive lens group and a third negative lens group (e.g., Japanese Unexamined Patent Publication No. 2-287507 assigned to the assignee of the present application). In either type, the lens diameter of the first lens group must be large enough to obtain a wide angle zoom lens, contrary to a need of miniaturization of the zoom lens.

SUMMARY OF THE INVENTION

It is an object of the present invention to provide a zoom lens system for a compact camera in which the half angle of view on the wide angle side is approximately 37°, and the variable power is approximately 3, wherein in particular, the lens diameter of the first lens group can be reduced.

To achieve the object mentioned above, according to an aspect of the present invention, there is provided a zoom lens system comprising at least three lens groups including a positive first lens group having a positive lens, a positive second lens group having a first negative lens assembly and a second positive lens assembly arranged in this order from the object to be photographed, and a negative third lens group. The first, second and third lens groups are arranged in this order from the object, and the first, second and third lens groups are moved toward the object upon a zooming operation from a short focal length to a long focal length. The lens groups satisfy the following relationship;

$$0 < f_w/f_1 < 0.5 \tag{1}$$

$$1.7 < N_{1p} \tag{2}$$

$$1.75 < N_{2aN} \tag{3}$$

$$1.7 < N_{2bP} \tag{4}$$

wherein $f_w$: focal length of the whole lens system at the wide angle extremity;

$f_1$: focal length of the first lens group;

$N_{1p}$: refractive index of the positive lens(es) of the first lens group;

$N_{2aN}$: refractive index of the negative lens(es) of the first negative lens assembly of the second lens group;

$N_{2bP}$: refractive index of the positive lens(es) of the second positive lens assembly of the second lens group.

Preferably, the zoom lens assembly satisfies the following relationship;

$$0.6 < \Sigma d_{I-II}/f_w < 0.9 \tag{5}$$

wherein $\Sigma d_{I-II}$: distance between the first lens surface of the first lens group and the last lens surface of the second lens group at the wide angle extremity (i.e, sum of the thicknesses of the associated lenses and the distance therebetween).

Preferably, the second lens assembly of the second lens group is provided therein with an aspherical lens surface which satisfies the following relationship;

$$-30 < \Delta I_{2b} < -10 \tag{6}$$

wherein $\Delta I_{2b}$: aberration factor of the aspherical surface term of the spherical aberration factor in the aspherical surface within the second lens assembly of the second lens group (aberration factor when the focal length of the whole lens system at the wide angle extremity is assumed to be 1.0).

The diaphragm is preferably provided between the second and third lens groups or within the second lens group and the diaphragm is moved together with the second lens group when the zooming operation is carried out.

The present disclosure relates to subject matter contained in Japanese patent application No. 5-184622 (filed on Jul. 27, 1993) which is expressly incorporated herein by reference in its entirety.

BRIEF DESCRIPTION OF THE DRAWINGS

The invention will be described below in detail with reference to the accompanying drawings, in which; FIG. 1 is a schematic view of a lens arrangement of a zoom lens system, according to a first embodiment of the present invention; FIG. 2 shows various aberration diagrams of a zoom lens system shown in FIG. 1; FIG. 3 shows various aberration diagrams of a zoom lens system shown in FIG. 1; FIG. 4 shows various aberration diagrams of a zoom lens system shown in FIG. 1; FIG. 11 shows various aberration diagrams of a zoom lens system shown in FIG. 9; and, FIG. 12 shows various aberration diagrams of a zoom lens system shown in FIG. 9.

DESCRIPTION OF THE PREFERRED EMBODIMENT

Figure 5:
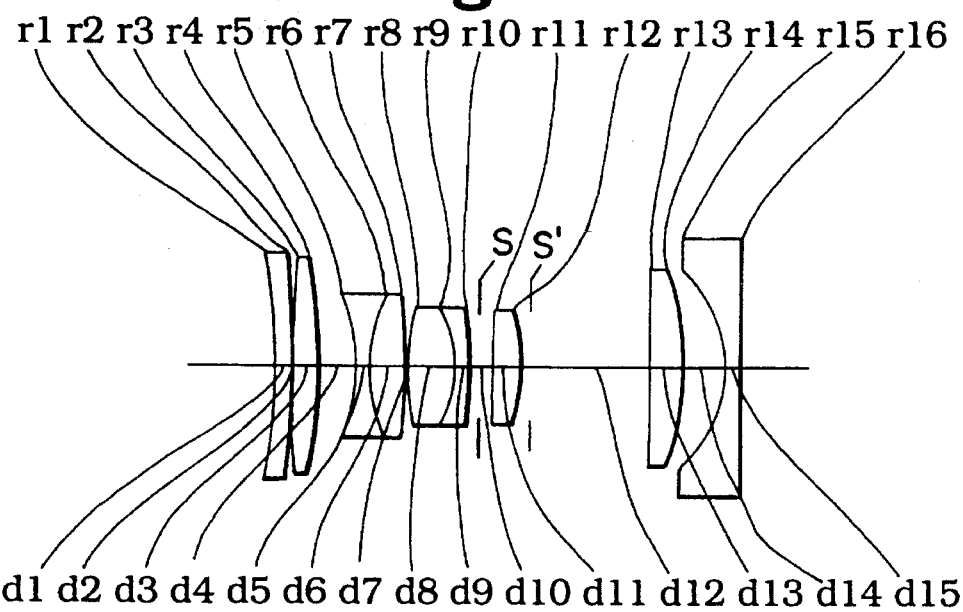
FIG. 5 is a schematic view of a lens arrangement of a zoom lens system, according to a second embodiment of the present invention.

In a zoom lens system according to the present invention which is comprised of three lens groups including a positive first lens group, a positive second lens group and a negative third lens group, the lenses of the first and second lens groups are made of a glass having a high refractive index, so that the lens diameter of the first lens group can be reduced while maintaining the half angle of view at a large value, i.e., approximately 37°.

The formula (1) specifies the power of the first lens group. If the half angle of view at the wide angle extremity is approximately 30°, the value of $f_w/f_1$ would, in many cases, exceed the upper limit. However, in a zoom lens in which the half angle of view is approximately 37° (i.e., the focal length is small) as in the present invention, if the power of the first lens group is a positive value larger than the upper limit, the back-focal length is too small, so that the lens diameters of the lens groups behind the first lens group increase; conversely, if the power of the first lens group is a positive value smaller than the lower limit, the displacement of the lens groups, particularly of the second and third lens groups, increases, so that the lens diameter of the second lens group and the diameter of the diaphragm increase.

The formula (2) specifies the refractive index of the positive lens of the first positive lens group. If the positive lens of the first positive lens group is made of a glass whose refractive index is smaller than the lower limit, it is difficult to correct the astigmatism or the distortion on the wide angle side. Moreover, it is necessary to increase the thickness of the lens to provide a sufficient thickness of the same at the peripheral edge thereof. If the angle of view increases, the lens diameter of the first lens group increases.

The formulae (3) and (4) specify the refractive indexes of the both negative lens of the negative lens assembly (first lens assembly) $2a$ of the second lens group and the positive lens of the positive lens assembly (second lens assembly) $2b$ of the second lens group (or the positive lens of the lens group that has largest power if the positive lens assembly includes more than one lens group), respectively. If the refractive indexes are smaller than the respective limits, it is difficult to correct the astigmatism. To compensate the astigmatism, it is necessary to increase the thickness of the second lens group, thus resulting in an increase in the lens diameter of the first lens group.

The formula (5) specifies the distance between the first surface of the first lens group and the last lens surface of the second lens group (i.e., the sum of the thicknesses of the lenses and the distance therebetween), in connection with the formulae (1) through (4). This directly relates to the lens diameter of the first lens group. If the value of the ratio defined by the formula (5) is above the upper limit, the lens diameter of the first lens group is too large to achieve the object of the present invention. Conversely, if the value of the ratio is below the lower limit, it is difficult to correct the astigmatism, although such a small value of the ratio contributes to the miniaturization of the lens diameter.

If the half angle of view is reduced to be 30° ($f_w$ is large), or if the variable power is small to be approximately 2, it is possible to produce a reduced zoom lens which satisfies the formula (5) even in the prior art. However, in the prior art, it is not necessary for the known zoom lens to be made of a glass having a high refractive index so as to meet the requirements defined by the formulae (1) through (4). Namely, there is no zoom lens hitherto known that satisfies the requirements defined by the formulae (1) through (4).

The formula (6) specifies the requirement for an aspheric lens surface. When the lens diameter of the first and second lens groups is small, a spherical aberration and a coma tend to occur. To this end, it is preferable that the aspherical lens surface is formed on the second lens assembly $2b$ of the second lens group whose effective diameter is determined by the bundle of rays on the optical axis. If the value of $\Delta I_{2b}$ is greater than the upper limit, then it is expected that the aspherical surface will not be large enough to correct the spherical aberration and the coma. Conversely, if the value is less than the lower limit, an excess correction (over correction) of the comatic aberration occurs, so that a high-order aberration will be produced.

Preferably, the diaphragm is provided behind or within the second lens group to reduce the lens diameters of the first lens group and the third lens group in a well balanced state. If the diaphragm is provided behind the second lens group, the structure or the assembling of the lens frame and the diaphragm can be simplified. If the diaphragm is provided within the second lens group, the diameter of the first lens group can be made smaller. Note that in the illustrated embodiments, the diaphragm is indicated by S' and S when the diaphragm is provided behind and within the second lens group, respectively. Either arrangement can be accepted in the present invention.

Upon focusing, it is preferable that the second lens group having a large power is moved toward an object to be photographed or the third lens group having a large power is moved toward an image surface to decrease the displacement of the second lens or the third lens and shorten the closest object distance. To simplify the mechanical arrangement, it is most preferable that the second lens group, which moves together with the diaphragm during the zooming operation, constitutes a focusing lens group.

FIRST EMBODIMENT

FIG. 1 shows a lens arrangement of a zoom lens according to a first embodiment of the present invention.

The zoom lens is comprised of nine lenses. The first negative lens 11 and the second positive lens 12 constitute the first lens group. The cemented lenses of the third lens 13 and the fourth lens 14 constitute the first lens assembly $2a$ of the second lens group and the cemented lenses of the fifth lens 15 and the sixth lens 16, and the seventh lens 17 constitute the second lens assembly $2b$ of the second lens group. The eighth lens 18 and the ninth lens 19 constitute the third lens group. The basic lens arrangement mentioned above is applied also to the second and third embodiments which will be discussed below.

Numerical data of the zoom lens system shown in FIG. 1 is shown in Tables 1 and 2 below. Diagrams of various aberrations thereof are shown in FIGS. 2, 3 and 4, respectively.

In FIGS. 2 through 4, "SA" designates the spherical aberration "SC" the sine condition, "d-line", "g-line" and "c-line" the chromatic aberration represented by the spherical aberration at the respective wavelengths, "S" the astigmatism in the sagittal direction, and "M" the astigmatism in the meridional direction.

In Tables and the drawings, "$r_i$" designates the radius of curvature of each lens surface, "$d_i$ the lens thickness or the distance between the lenses, "N" the refractive index, and "ν" the Abbe number, respectively.

TABLE 1

$F_{NO}$ = 1:3.6–5.8–9.3
F = 29.00–50.00–87.00
ω = 37.4–23.1–13.8
$F_B$ = 8.39–26.53–55.62 wherein, $F_{NO}$ represents f-number,

F represents a focal length,

ω represents a half angle of view;and, $F_B$ represents a back focal length.

TABLE 2

| surface No. | r | d | N | ν |
|---|---|---|---|---|
| 1 | −45.105 | 1.49 | 1.84666 | 23.8 |
| 2 | −103.298 | 0.10 | | |
| 3 | 168.248 | 2.50 | 1.80400 | 46.6 |
| 4 | −55.228 | 2.38–9.30–17.25 | | |
| 5 | −18.337 | 1.34 | 1.83481 | 42.7 |
| 6 | 13.552 | 3.40 | 1.80518 | 25.4 |
| 7 | −89.886 | 0.39 | | |
| 8 | 22.623 | 4.12 | 1.48749 | 70.2 |
| 9 | −10.914 | 2.19 | 1.84666 | 23.8 |
| 10 | −50.413 | 1.07 | | |
| 11 | 56.681 | 2.85 | 1.73077 | 40.5 |
| 12* | −16.274 | 0.74 | | |
| stop | ∞ | 11.56–5.44–1.50 | | |
| 13* | −106.115 | 2.85 | 1.58547 | 29.9 |
| 14 | −28.684 | 4.08 | | |
| 15 | −11.904 | 1.39 | 1.77250 | 49.6 |
| 16 | 691.199 | — | | |

*marked surface is aspherical.
No. 12; K = 0.0, A4 = 0.58377 × $10^{-4}$, A6 = −0.67182 × $10^{-7}$, A8 = 0.18937 × $10^{-8}$, A10 = 0.0, A12 = 0.0
No. 13; K = 0.0, A4 = 0.50282 × $10^{-4}$, A6 = 0.63151 × $10^{-7}$, A8 = 0.13732 × $10^{-8}$, A10 = 0.0, A12 = 0.0

Aspherical surface is defined by the following conditions;

$$x = cy^2/\{1+[1-(1+K)c^2y^2]^{1/2}\} + A4y^4 + A6y^6 + A8y^8 + A10y^{10} +$$

wherein, y represents a height above the axis, x represents a distance from a tangent plane of an aspherical vertex, c represents a curvature of the aspherical vertex ( 1/r ), K represents a conic constant, A4 represents a fourth-order aspherical aberration factor, A6 represents a sixth-order aspherical aberration factor, A8 represents a eighth-order aspherical aberration factor; and, A10 represents a tenth-order aspherical aberration factor.

"$d_{12}$" shown in FIG. 1 which shows the distance between the surfaces $r_{12}$ and $r_{13}$ corresponds to the sum of the values of $d_{12}$ and $d_{stop}$ in Tables.

SECOND EMBODIMENT

Figure 6:
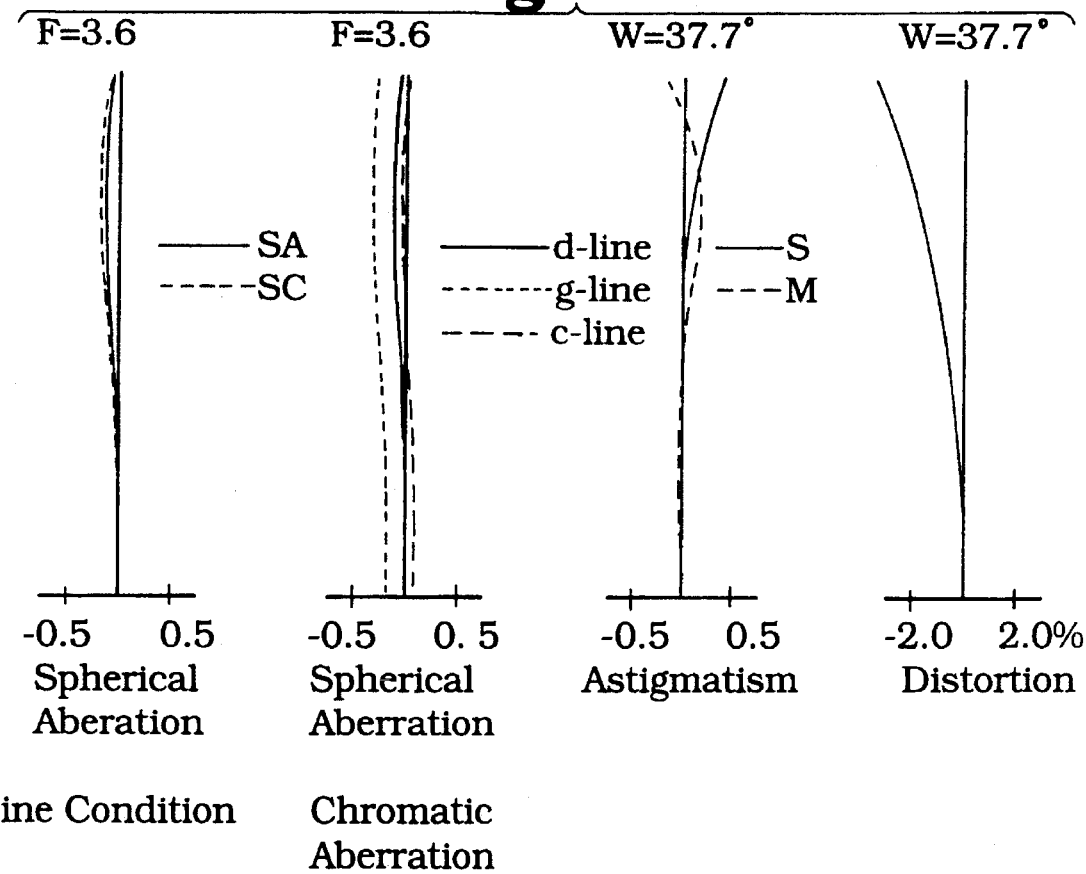
FIG. 6 shows various aberration diagrams of a zoom lens system shown in FIG. 5.
Figure 7:
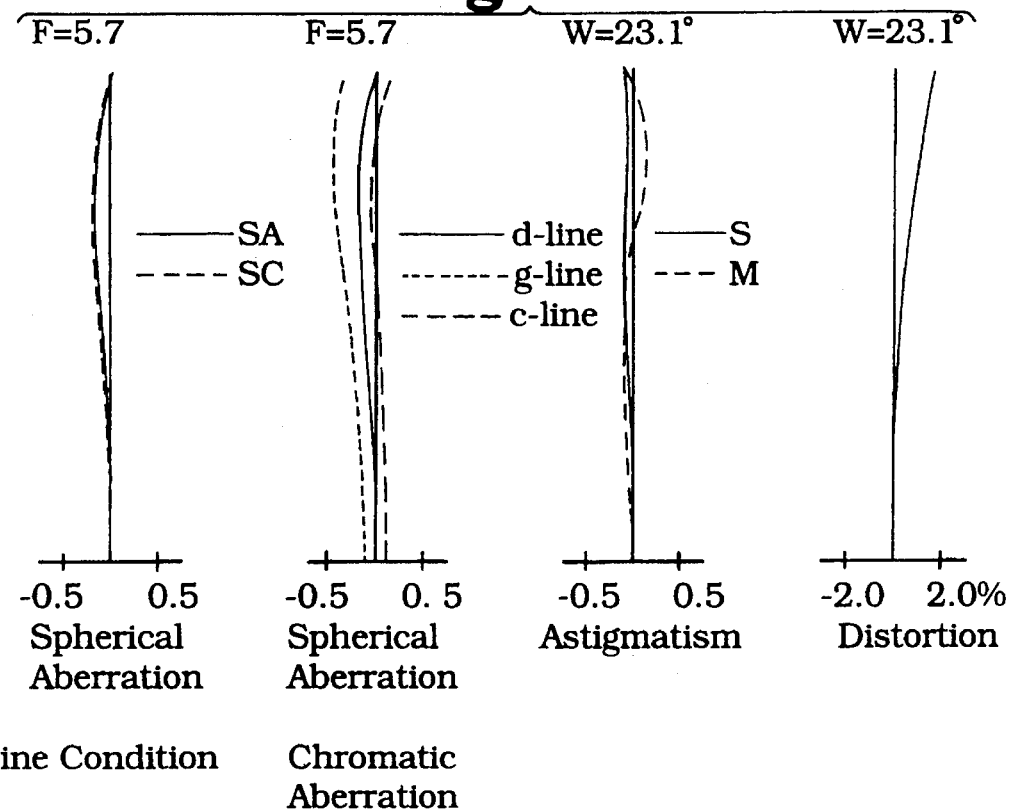
FIG. 7 shows various aberration diagrams of a zoom lens system shown in FIG. 5.
Figure 8:
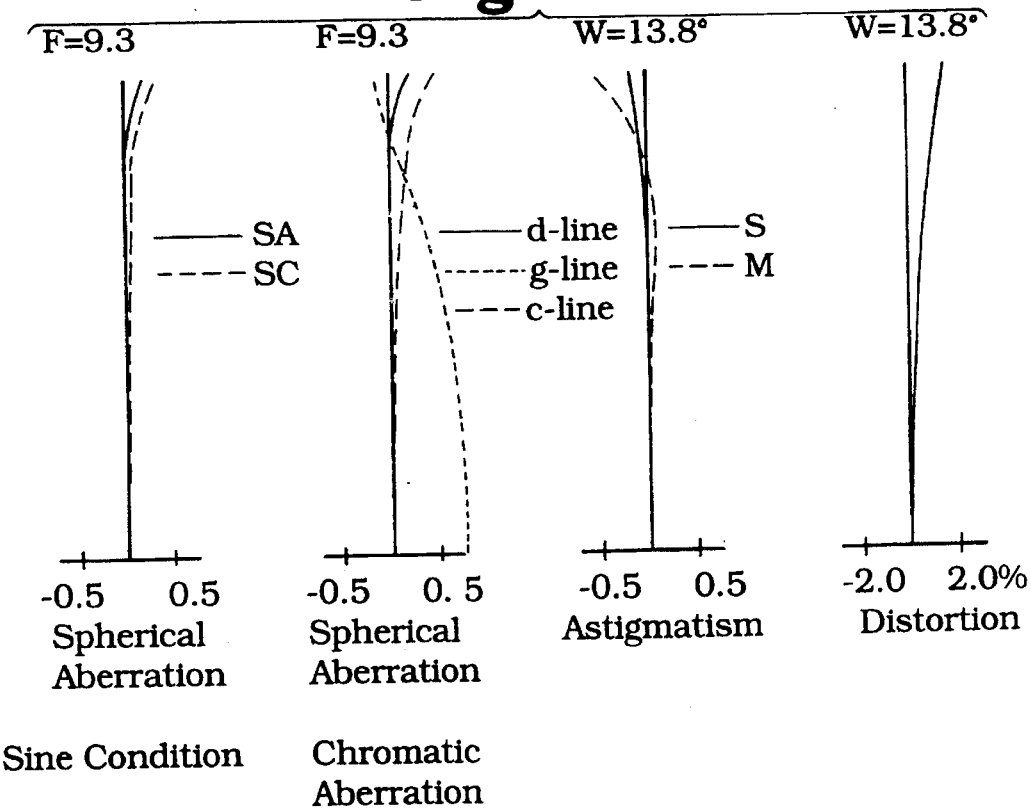
FIG. 8 shows various aberration diagrams of a zoom lens system shown in FIG. 5.

FIG. 5 shows a lens arrangement of a zoom lens system according to a second embodiment of the present invention. Numerical data of the lens system shown in FIG. 5 is shown in Tables 3 and 4 below. Diagrams of various aberrations thereof are shown in FIGS. 6, 7 and 8, respectively.

TABLE 3

$F_{NO}$ = 1:3.6–5.8–9.3
F = 29.00–50.00–87.01
ω = 37.7–23.1–13.8
$F_B$ = 8.40–26.83–57.00

TABLE 4

| surface No. | r | d | N | ν |
|---|---|---|---|---|
| 1 | −48.225 | 1.50 | 1.84666 | 23.8 |
| 2 | −124.612 | 0.10 | | |
| 3 | 256.743 | 2.44 | 1.80400 | 46.6 |
| 4 | −52.175 | 3.15–9.71–17.03 | | |
| 5 | −17.799 | 1.35 | 1.83481 | 42.7 |
| 6 | 13.751 | 3.11 | 1.80518 | 25.4 |
| 7 | −77.005 | 0.35 | | |
| 8 | 23.599 | 4.30 | 1.48749 | 70.2 |
| 9 | −10.846 | 1.50 | 1.80518 | 25.4 |
| 10 | −36.860 | 1.94 | | |
| 11 | 66.821 | 2.87 | 1.74320 | 49.3 |
| 12* | −17.568 | 0.75 | | |
| stop | ∞ | 11.20–5.26–1.50 | | |
| 13* | −78.276 | 2.93 | 1.58547 | 29.9 |
| 14 | −26.737 | 3.93 | | |
| 15 | −11.769 | 1.40 | 1.77250 | 49.6 |
| 16 | 1905.680 | — | | |

*marked surface is aspherical.
No. 12; K = 0.0, A4 = 0.48965 × $10^{-4}$, A6 = −0.13006 × $10^{-7}$, A8 = 0.11175 × $10^{-8}$, A10 = 0.0, A12 = 0.0
No. 13; K = 0.0, A4 = 0.51525 × $10^{-4}$, A6 = 0.12760 × $10^{-6}$, A8 = 0.13519 × $10^{-8}$, A10 = 0.0, A12 = 0.0

THIRD EMBODIMENT

Figure 9:
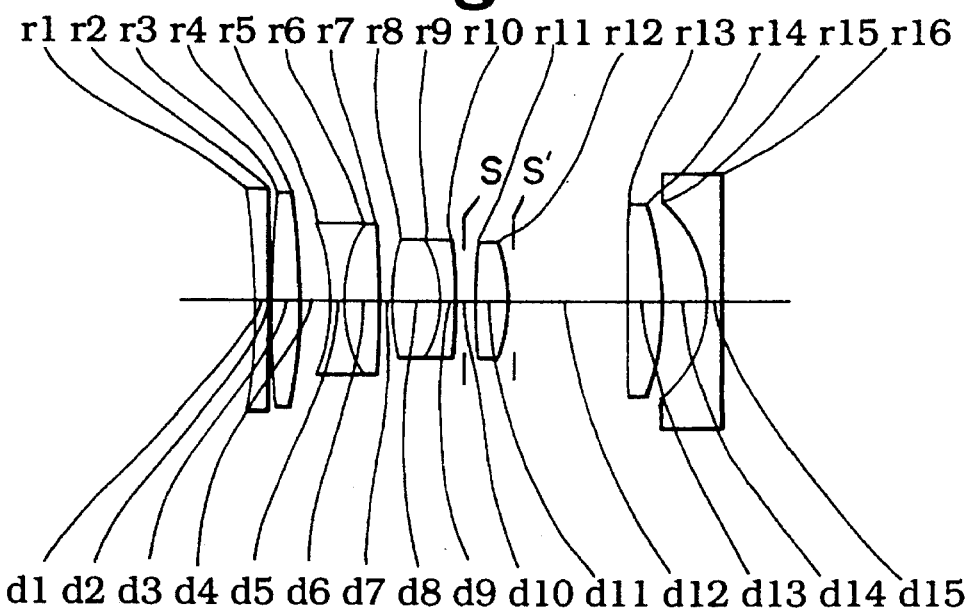
FIG. 9 is a schematic view of a lens arrangement of a zoom lens system, according to a third embodiment of the present invention.

FIG. 9 shows a lens arrangement of a zoom lens system according to a third embodiment of the present invention.

Figure 10:
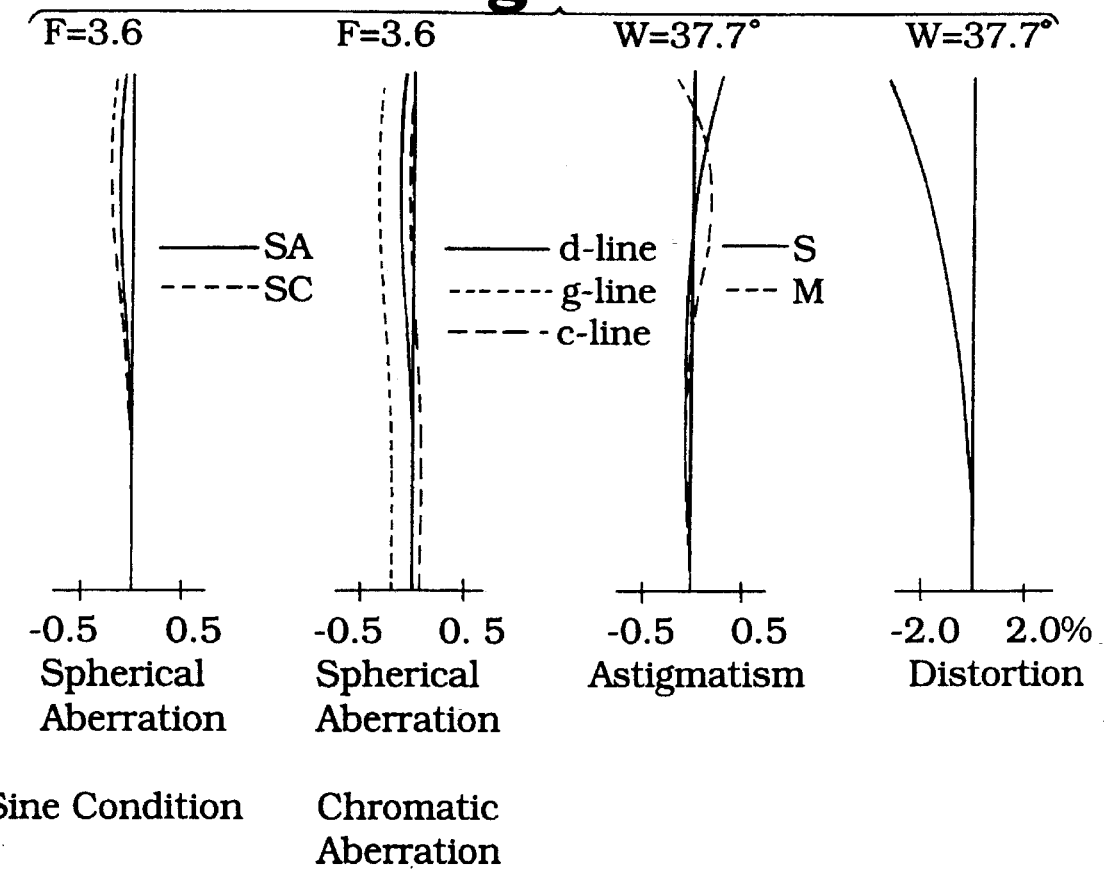
FIG. 10 shows various aberration diagrams of a zoom lens system shown in FIG. 9.

Numerical data of the lens system shown in FIG. 9 is shown in Tables 5 and 6 below. Diagrams of various aberrations thereof are shown in FIGS. 10, 11 and 12, respectively.

TABLE 5

$F_{NO}$ = 1:3.6–5.7–9.3
F = 29.00–50.00–87.01
ω 37.7–23.1–13.8
$F_B$ = 8.45–26.53–55.59

TABLE 6

| Surface No. | r | d | N | ν |
|---|---|---|---|---|
| 1 | −62.085 | 1.50 | 1.84666 | 23.8 |
| 2 | −197.883 | 0.10 | | |
| 3 | 150.182 | 2.36 | 1.77250 | 49.6 |
| 4 | −65.438 | 2.68–9.32–17.67 | | |
| 5 | −19.051 | 1.35 | 1.83481 | 42.7 |
| 6 | 13.187 | 3.26 | 1.80518 | 25.4 |
| 7 | −85.771 | 1.08 | | |
| 8 | 22.433 | 4.27 | 1.48749 | 70.2 |
| 9 | −10.602 | 1.50 | 1.84666 | 23.8 |
| 10 | −42.096 | 1.68 | | |
| 11 | 60.817 | 2.87 | 1.73077 | 40.5 |

TABLE 6-continued

| Surface No. | r | d | N | ν |
|---|---|---|---|---|
| 12* | −16.711 | 0.75 | | |
| stop | ∞ | 10.83−5.10−1.50 | | |
| 13* | −110.636 | 2.82 | 1.58547 | 29.9 |
| 14 | −30.467 | 4.30 | | |
| 15 | −11.324 | 1.40 | 1.77250 | 49.6 |
| 16 | −1043.725 | | | |

*marked surface is aspherical.
No. 12; K = 0.0, A4 = 0.53732 × $10^{-4}$, A6 = −0.51631 × $10^{-7}$, A8 = 0.13376 × $10^{-8}$, A10 = 0.0, A12 = 0.0
No. 13; K = 0.0, A4 = 0.57141 × $10^{-4}$, A6 = 0.68411 × $10^{-7}$, A8 = 0.21756 × $10^{-8}$, A10 = 0.0, A12 = 0.0

The values of the formulae (1) through (6) in the first, second and third embodiments are shown in Table 7 below.

TABLE 7

| | example 1 | example 2 | example 3 |
|---|---|---|---|
| formulas (1) | 0.27 | 0.24 | 0.23 |
| formulas (2) | 1.804 | 1.804 | 1.773 |
| formulas (3) | 1.835 | 1.835 | 1.835 |
| formulas (4) | 1.731 | 1.743 | 1.731 |
| formulas (5) | 0.75 | 0.78 | 0.78 |
| formulas (6) | −17.8 | −14.3 | −16.0 |

As can be seen from Table 7 above, all the three embodiments satisfy the requirements defined by the formulae (1) through (6). Moreover, according to the present invention, the half angle of view at the wide angle extremity is large to be 37°, and the power is approximately 3. In addition, the aberrations are correctly compensated. As may be understood from the above discussion, according to the present invention, a simple and small zoom lens system which is comprised of three lens groups of first, second and third lens groups can be obtained wherein the half angle of view at the wide angle extremity is 37°; the power is approximately 3 ; and, the lens diameter of the first lens group is small.

I claim:

1. A zoom lens system comprising at least three lens groups including:

a positive first lens group comprising a positive lens;

a positive second lens group comprising a negative lens assembly including a negative lens and a positive lens assembly including a positive lens arranged in this order from the object to be photographed said positive lens assembly of said positive second lens group comprises an aspherical lens surface which satisfies the following relationship:

$$-30 < \Delta I_{2b} < -10$$

wherein $\Delta I_{2b}$ is an aberration factor of an aspherical surface term of a spherical aberration factor of an aspherical surface within said second positive lens assembly of said positive second lens group when said focal length of the whole lens system at the wide angle extremity is assumed to be 1.0; and;

a negative third lens group;

said first, second and third lens groups being arranged in this order from said object;

wherein said lens groups satisfy the following relationships:

$$0 < f_w/f_1 < 0.5$$

$$1.7 < N_{1P}$$

$$1.75 < N_{2aN}$$

$$1.7 < N_{2bP}$$

wherein $f_w$ is a focal length of the whole lens system at a wide angle extremity;

$f_1$ is a focal length of the first lens group;

$N_{1P}$ is a refractive index of said positive lens of said first lens group;

$N_{2aN}$ is a refractive index of said negative lens of said negative lens assembly of said second lens group; and $N_{2bP}$ is a refractive index of said positive lens of said positive lens assembly of said second lens group.

2. A zoom lens system according to claim 1, further satisfying the relationship:

$$0.6 < \Sigma d_{I-II}/f_w < 0.9$$

wherein $\Sigma d_{I-II}$ is a distance between a first lens surface of said first positive lens group and a last lens surface of said second positive lens group at the wide angle extremity.

3. A zoom lens system according to claim 1, further comprising a diaphragm between said second and third lens groups, wherein said diaphragm is moved together with said second lens group when the zooming operation is carried out.

4. A zoom lens system according to claim 1, said first lens group further comprising a negative lens, said negative lens and said positive lens being arranged in this order from said object.

5. A zoom lens system according to claim 1, wherein said first, second and third lens groups are moved toward said object upon the zooming operation from a short focal length to a long focal length.

6. A zoom lens system according to claim 1, further comprising a diaphragm within said second lens group, wherein said diaphragm is moved together with said second lens group when the zooming operation is carried out.

7. A zoom lens system comprising at least three lens groups including:

a positive first lens group comprising a positive lens;

a positive second lens group comprising a negative lens assembly including a negative lens and a positive lens assembly including a positive lens arranged in this order from the object to be photographed; and, a negative third lens group;

said first, second and third lens groups being arranged in this order from said object, distances between each lens group changing during a zooming operation;

a half angle of view at a wide angle extremity of said whole lens system being approximately 37 degrees; wherein said lens groups satisfy the following relationships:

$$0 < f_w/f_1 < 0.5$$

$$1.7 < N_{1P}$$

$$1.75 < N_{2aN}$$

$$1.7 < N_{2bP}$$

wherein $f_w$ is a focal length of the whole lens system at the wide angle extremity;

$f_1$ is a focal length of said positive first lens group;

$N_{1p}$ is a refractive index of said positive lens of said positive first lens group;

$N_{2aN}$ is a refractive index of said negative lens of said negative lens assembly of said positive second lens group; and $N_{2bP}$ is a refractive index of said positive lens of said positive lens assembly of said second positive lens group.

8. The zoom lens system according to claim 7, further satisfying the following relationship:

$$0.6 < \Sigma d_{I-II}/f_w < 0.9$$

wherein $\Sigma d_{I-II}$ is a distance between the first lens surface of said first positive lens group and the last lens surface of said second positive lens group at the wide angle extremity.

9. The zoom lens system according to claim 7, wherein said positive lens assembly of said second positive lens group comprises an aspherical lens surface which satisfies the following relationship:

$$-30 < \Delta I_{2b} < -10$$

wherein $\Delta I_{2b}$ is an aberration factor of an aspherical surface term of a spherical aberration factor of an aspherical surface within said positive lens assembly of said second positive lens group when said focal length of the whole lens system at a wide angle extremity is assumed to be 1.0.

10. The zoom lens system according to claim 7, further comprising a diaphragm between said second positive and third negative lens groups, wherein said diaphragm is moved together with said second positive lens group when a zooming operation is carried out.

11. The zoom lens system according to claim 7, said first positive lens group further comprising a negative lens, said negative lens and said positive lens of said first positive lens group being arranged in this order from said object.

12. The zoom lens system according to claim 7, wherein said first, second and third lens groups are moved toward said object during a zooming operation from a short focal length to a long focal length.

13. The zoom lens system according to claim 7, further comprising a diaphragm within said second lens group, wherein said diaphragm is moved together with said second lens group when a zooming operation is performed.

14. The zoom lens system according to claim 1, wherein distances between each lens group change during a zooming operation.

15. A zoom lens system comprising at least three lens groups including:

a positive first lens group comprising a positive lens;

a positive second lens group comprising a negative lens assembly including a negative lens and a positive lens assembly including a positive lens arranged in this order from the object to be photographed; and, a negative third lens group;

said first, second and third lens groups being arranged in this order from said object;

a diaphragm positioned between said second positive and third negative lens groups, said diaphragm being moved together with said second positive lens group when a zooming operation is carried out;

a half angle of view at a wide angle extremity of said whole lens system being approximately 37 degrees;

wherein said lens groups satisfy the following relationships:

$$0 < f_w/f_1 < 0.5$$

$$1.7 < N_{1P}$$

$$1.75 < N_{2aN}$$

$$1.7 < N_{2bP}$$

wherein $f_w$ is a focal length of the whole lens system at the wide angle extremity;

$f_1$ is a focal length of said positive first lens group;

$N_{1P}$ is a refractive index of said positive lens of said positive first lens group;

$N_{2aN}$ is a refractive index of said negative lens of said negative lens assembly of said positive second lens group; and $N_{2bP}$ is a refractive index of said positive lens of said positive lens assembly of said second positive lens group.

* * * * *